United States Patent
Tamura et al.

(10) Patent No.: US 9,624,368 B2
(45) Date of Patent: Apr. 18, 2017

(54) ACRYLIC RESIN COMPOSITION, ACRYLIC RESIN SHEET, ACRYLIC RESIN LAMINATE, AND MANUFACTURING METHOD FOR SAME

(75) Inventors: Yukiko Tamura, Hiroshima (JP); Masahiko Ono, Hiroshima (JP); Osamu Kawai, Hiroshima (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 529 days.

(21) Appl. No.: 14/115,915

(22) PCT Filed: May 8, 2012

(86) PCT No.: PCT/JP2012/061756
§ 371 (c)(1),
(2), (4) Date: Nov. 6, 2013

(87) PCT Pub. No.: WO2012/153733
PCT Pub. Date: Nov. 15, 2012

(65) Prior Publication Data
US 2014/0141270 A1    May 22, 2014

(30) Foreign Application Priority Data

May 10, 2011  (JP) .................. 2011-105189
Jun. 13, 2011  (JP) .................. 2011-131182
Nov. 28, 2011  (JP) .................. 2011-259269

(51) Int. Cl.
C08L 33/12 (2006.01)
B32B 27/08 (2006.01)
B32B 27/30 (2006.01)
B29C 45/00 (2006.01)
B29C 45/14 (2006.01)
C08J 7/04 (2006.01)

(52) U.S. Cl.
CPC .......... *C08L 33/12* (2013.01); *B29C 45/0001* (2013.01); *B29C 45/14008* (2013.01); *B32B 27/08* (2013.01); *B32B 27/308* (2013.01); *C08J 7/042* (2013.01); *B32B 2307/558* (2013.01); *C08J 2333/12* (2013.01); *C08J 2433/12* (2013.01); *Y10T 428/31935* (2015.04)

(58) Field of Classification Search
None
See application file for complete search history.

(56) References Cited

U.S. PATENT DOCUMENTS 6,652,985 B1 * 11/2003 Tadokoro ............... B32B 27/08
428/515

FOREIGN PATENT DOCUMENTS

| EP | 0259802 A2 | 3/1988 |
|---|---|---|
| JP | 43-2466 | 1/1968 |
| JP | 43-16848 | 7/1968 |
| JP | 49-19712 | 5/1974 |
| JP | 54-12518 | 5/1979 |
| JP | 55-27576 | 7/1980 |
| JP | 60-144308 | 7/1985 |
| JP | 60-147407 | 8/1985 |
| JP | 05-065385 | 3/1993 |
| JP | 05-269946 | 10/1993 |
| JP | 09-302010 | 11/1997 |
| JP | 10-095885 | 4/1998 |
| JP | 2000-246845 | 9/2000 |
| JP | 2004-263135 | 9/2004 |
| JP | 2006-045407 | 2/2006 |
| JP | 2001-192523 | 7/2011 |
| TW | 200824906 A | 6/2008 |

OTHER PUBLICATIONS

Office Action issued in counterpart Taiwanese Patent Application No. 10520011360 dated Jan. 8, 2016.
Extended European Search Report issued in counterpart European Patent Application No. 12781926.6 dated Mar. 3, 2014.
Database WPI; Week 200617; Thomson Scientific, London, GB; AN 2006-160129; XP002720740 & JP2006045407 A (Matsushita Electric Works Ltd.) Feb. 16, 2006.

* cited by examiner

*Primary Examiner* — Sheeba Ahmed
(74) *Attorney, Agent, or Firm* — Morgan, Lewis & Bockius LLP

(57) ABSTRACT

Provided are an acrylic resin composition, an acrylic resin sheet, and an acrylic resin laminate that exhibit superior transparency and impact resistance. The acrylic resin composition contains 100 parts by mass of an acrylic polymer (A) having 50 to 100% by mass of a methyl methacrylate unit and 0.002 to 0.7 parts by mass of an olefin-alkyl (meth)acrylate copolymer (B). The copolymer (B) is preferably an ethylene-alkyl acrylate copolymer (B-2). The acrylic resin sheet contains this acrylic resin composition. The acrylic resin sheet has a haze value of 0.5% or less based on JIS K 7136, a 50% impact-puncture height of at least 350 mm or more in a falling ball test based on JIS K 7211 under the described conditions, and a sheet thickness of 2 mm or less. The acrylic resin laminate has a cured layer laminated on at least one surface of the acrylic resin sheet.

8 Claims, 1 Drawing Sheet

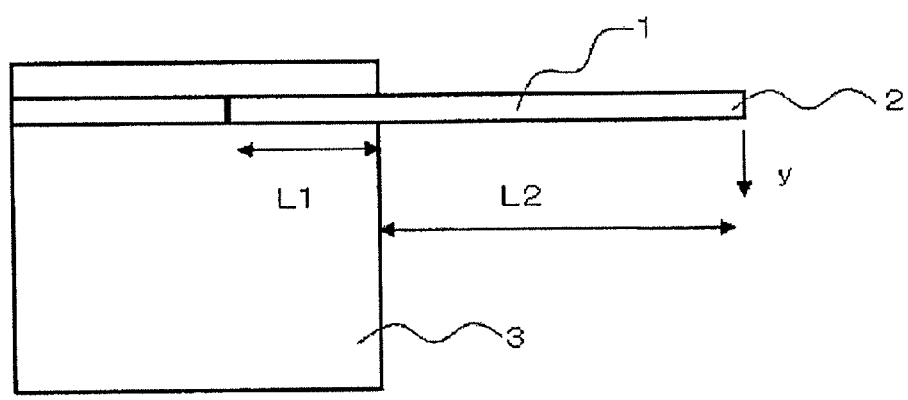

ACRYLIC RESIN COMPOSITION, ACRYLIC RESIN SHEET, ACRYLIC RESIN LAMINATE, AND MANUFACTURING METHOD FOR SAME

TECHNICAL FIELD

The present invention relates to an acrylic resin composition, an acrylic resin sheet, an acrylic resin laminate, and a manufacturing method therefor.

BACKGROUND ART

Having excellent transparency, an acrylic resin is used for a front panel of various displays including CRT and a liquid crystal TV, and also widely used as industrial materials or constructional materials. However, the acrylic resin does not necessarily have sufficient impact strength.

As a method of improving impact resistant of an acrylic resin, there is a method of adding rubber particles of multilayer structure polymer containing an elastomer layer to an acrylic resin and cast-polymerizing it (see, Patent Document 1). However, when the rubber particles are added to an acrylic resin, heat resistance or elasticity of the acrylic resin tends to be lowered.

There is also a method of dissolving an ethylene-vinyl acetate copolymer in methyl methacrylate and cast-polymerizing it (see, Patent Documents 2 to 4). However, the ethylene-vinyl acetate copolymer is problematic in that the side chains of the copolymer are decomposed by heat or UV rays to generate easily acetic acid.

There is also a method of co-polymerizing a copolymer of vinyl acetate and ethylene, or a copolymer of (meth)acrylic acid alkyl ester and ethylene with methyl methacrylate (see, Patent Document 5). However, as the addition amount of the copolymer of vinyl acetate and ethylene, or the copolymer of (meth)acrylic acid alkyl ester and ethylene is large, cost for producing an acrylic resin is high and transparency of an acrylic resin sheet tends to be lowered.

CITATION LIST

Patent Document

Patent Document 1: JP 55-27576 B
Patent Document 2: JP 54-12518 B
Patent Document 3: JP 43-2466 B
Patent Document 4: JP 43-16848 B
Patent Document 5: JP 49-19712 B

SUMMARY OF INVENTION

Technical Problem

The present invention is to solve the each problem described above. Specifically, an object of the invention is to provide an acrylic resin composition, an acrylic resin sheet, an acrylic resin laminate having excellent transparency and impact resistance, and a manufacturing method therefor.

Solution to Problem

The above problems are solved by the following [1] to [43].

[1] An acrylic resin composition containing 100 parts by mass of an acrylic polymer (A) having a methyl methacrylate unit and 0.002 to 0.7 parts by mass of an olefin-alkyl (meth)acrylate copolymer (B).

[2] The acrylic resin composition described in above [1], in which the acrylic polymer (A) having a methyl methacrylate unit is an acrylic polymer (A-1) having 50 to 100% by mass of the methyl methacrylate unit and 0 to 50% by mass of other vinyl monomer unit.

[3] The acrylic resin composition described in above [2], in which the olefin-alkyl (meth)acrylate copolymer (B) is an ethylene-alkyl (meth)acrylate copolymer (B-1).

[4] The acrylic resin composition described in above [3], in which the ethylene-alkyl (meth)acrylate copolymer (B-1) is an ethylene-alkyl acrylate copolymer (B-2).

[5] The acrylic resin composition described in above [2] or [3], in which the other vinyl monomer unit is at least one selected from a (meth)acrylic acid ester unit having an alicyclic hydrocarbon group with 6 to 20 carbon atoms, a (meth)acrylic acid ester unit having a linear or branched hydrocarbon group with 3 to 10 carbon atoms, and a monomer unit having two or more ethylenically unsaturated bonds in the monomer.

[6] The acrylic resin composition described in above [4], in which the other vinyl monomer unit is at least one selected from a (meth)acrylic acid ester unit having an alicyclic hydrocarbon group with 6 to 20 carbon atoms, a (meth)acrylic acid ester unit having a linear or branched hydrocarbon group with 3 to 10 carbon atoms, and a monomer unit having two or more ethylenically unsaturated bonds in the monomer.

[7] The acrylic resin composition described in above [4], in which a content of the ethylene-alkyl acrylate copolymer (B-2) is 0.02 to 0.5 parts by mass based on 100 parts by mass of the acrylic polymer (A-1).

[8] The acrylic resin composition described in any one of above [4], [6] and [7], in which a content of the alkyl acrylate unit in the ethylene-alkyl acrylate copolymer (B-2) is 15 to 40% by mass.

[9] An acrylic resin sheet containing the acrylic resin composition described in any one of above [1], [2], [3], [4], [6], and [7], in which the olefin-alkyl (meth)acrylate copolymer (B), the ethylene-alkyl (meth)acrylate copolymer (B-1), or the ethylene-alkyl acrylate copolymer (B-2) is dispersed in the acrylic polymer (A) or the acrylic polymer (A-1).

[10] An acrylic resin sheet containing the acrylic resin composition described in above [5], in which the olefin-alkyl (meth)acrylate copolymer (B) or the ethylene-alkyl (meth)acrylate copolymer (B-1) is dispersed in the acrylic polymer (A-1).

[11] An acrylic resin sheet containing the acrylic resin composition described in above [8], in which the ethylene-alkyl acrylate copolymer (B-2) is dispersed in the acrylic polymer (A-1).

[12] An acrylic resin sheet which has a haze value of 0.5% or less based on JIS K 7136, 50% impact-puncture height of 350 mm or more in a falling ball test based on JIS K 7211 under the conditions described below, and a sheet thickness of 2 mm or less:

<Method for Falling Ball Test>
Size of test specimen: square with a single side length of 50 mm,
Size of supporting board: a 5 mm-thick acrylic plate having a round hole with a diameter of 20 mm,
Size of falling ball: a ball made of stainless steel (ball diameter: 20.0 mmφ, mass: 35.9 g),
Temperature of measurement atmosphere: 23° C.,
Relative humidity of measurement atmosphere: 50%, Time for keeping a test specimen before measurement in measurement atmosphere: 24 hours or longer, and Test method: Test order described in JIS K 7211-1 is followed. The test specimen is placed on top of the supporting board such that the center of the hole in the supporting board is in match with the center of the test specimen. Right and left sides of the test specimen are fixed on the supporting board using a cellophane tape, and then a stainless steel ball is dropped onto the center of the test specimen under the conditions including a temperature of 23° C. and a relative humidity of 50%. The falling height is changed by 25 mm, and the test number for each falling height is 20.

[13] The acrylic resin sheet described in above [12], in which a water absorption displacement amount y measured by the method described below, is 45 mm or less.

<Method for Measuring Water Absorption Displacement Amount>

A test specimen of the sheet with a length of 200 mm and a width of 50 mm is kept for 24 hours under an environment including a temperature of 85° C. and a relative humidity of 85% while one end of the specimen (length: 50 mm) is fixed in a horizontal state. Subsequently, a warpage amount (water absorption displacement amount) y in perpendicular direction of the other end of the test specimen that has not been fixed is measured.

[14] The acrylic resin sheet described in above [12] which contains the acrylic resin composition described in any one of above [1], [2], [3], [4], [6], and [7], in which the olefin-alkyl (meth)acrylate copolymer (B), the ethylene-alkyl (meth)acrylate copolymer (B-1), or the ethylene-alkyl acrylate copolymer (B-2) is dispersed in the acrylic polymer (A) or the acrylic polymer (A-1).

[15] The acrylic resin sheet described in above [12] which contains the acrylic resin composition described in above [5], in which the olefin-alkyl (meth)acrylate copolymer (B) or the ethylene-alkyl (meth)acrylate copolymer (B-1) is dispersed in the acrylic polymer (A-1).

[16] The acrylic resin sheet described in above [12] which contains the acrylic resin composition described in above [8], in which the ethylene-alkyl acrylate copolymer (B-2) is dispersed in the acrylic polymer (A-1).

[17] The acrylic resin sheet described in above [13] which contains the acrylic resin composition described in above [5], in which the olefin-alkyl (meth)acrylate copolymer (B) or the ethylene-alkyl (meth)acrylate copolymer (B-1) is dispersed in the acrylic polymer (A-1).

[18] The acrylic resin sheet described in above [13] which contains the acrylic resin composition described in above [6], in which the ethylene-alkyl acrylate copolymer (B-2) is dispersed in the acrylic polymer (A-1).

[19] A method of manufacturing the acrylic resin sheet described in any one of above [10] to [13] and [15] to [18], in which, as a polymerizable raw material, a raw material composition (1) containing a monomer component (a) containing methyl methacrylate or a monomer mixture having methyl methacrylate and other vinyl monomers and the ethylene-alkyl acrylate copolymer (B-2), or a raw material composition (2) containing syrup (1) obtained by polymerizing a part of the monomer component (a) and the ethylene-alkyl acrylate copolymer (B-2) is used, a sheet-like polymer is produced by polymerization-curing the polymerizable raw material after injecting it into a cast formed by two plates that are oppositely aligned at a predetermined interval and a sealing material placed along their periphery, and the sheet-like polymer is released from the cast.

[20] A method of manufacturing the acrylic resin sheet described in above [9], in which, as a polymerizable raw material, a raw material composition (1) containing a monomer component (a) containing methyl methacrylate or a monomer mixture having methyl methacrylate and other vinyl monomers and the ethylene-alkyl acrylate copolymer (B-2), or a raw material composition (2) containing syrup (1) obtained by polymerizing a part of the monomer component (a) and the ethylene-alkyl acrylate copolymer (B-2) is used, a sheet-like polymer is produced by polymerization-curing the polymerizable raw material after injecting it into a cast formed by two plates that are oppositely aligned at a predetermined interval and a sealing material placed along their periphery, and the sheet-like polymer is released from the cast.

[21] A method of manufacturing the acrylic resin sheet described in above [14], in which, as a polymerizable raw material, a raw material composition (1) containing a monomer component (a) containing methyl methacrylate or a monomer mixture having methyl methacrylate and other vinyl monomers and the ethylene-alkyl acrylate copolymer (B-2), or a raw material composition (2) containing syrup (1) obtained by polymerizing a part of the monomer component (a) and the ethylene-alkyl acrylate copolymer (B-2) is used, a sheet-like polymer is produced by polymerization-curing the polymerizable raw material after injecting it into a cast formed by two plates that are oppositely aligned at a predetermined interval and a sealing material placed along their periphery, and the sheet-like polymer is released from the cast.

[22] A method of manufacturing the acrylic resin sheet described in any one of above [10] to [13] and [15] to [18], in which, as a polymerizable raw material, a raw material composition (3) containing syrup (2) obtained by polymerizing a part of the mixture containing the monomer component (a) containing methyl methacrylate or a monomer mixture having methyl methacrylate and other vinyl monomers and the ethylene-alkyl acrylate copolymer (B-2) is used, a sheet-like polymer is produced by polymerization-curing the polymerizable raw material after injecting it into the cast formed by two plates that are oppositely aligned at a predetermined interval and a sealing material placed along their periphery, and the sheet-like polymer is released from the cast.

[23] A method of manufacturing the acrylic resin sheet described in above [9], in which, as a polymerizable raw material, a raw material composition (3) containing syrup (2) obtained by polymerizing a part of a mixture containing a monomer component (a) containing methyl methacrylate or a monomer mixture having methyl methacrylate and other vinyl monomers and the ethylene-alkyl acrylate copolymer (B-2) is used, a sheet-like polymer is produced by polymerization-curing the polymerizable raw material after injecting it into a cast formed by two plates that are oppositely aligned at a predetermined interval and a sealing material placed along their periphery, and the sheet-like polymer is released from the cast.

[24] A method of manufacturing the acrylic resin sheet described in above [14], in which, as a polymerizable raw material, a raw material composition (3) containing syrup (2) obtained by polymerizing a part of a mixture containing a monomer component (a) containing methyl methacrylate or a monomer mixture having methyl methacrylate and other vinyl monomers and the ethylene-alkyl acrylate copolymer (B-2) is used, a sheet-like polymer is produced by polymerization-curing the polymerizable raw material after injecting it into a cast formed by two plates that are oppositely aligned at a predetermined interval and a sealing material placed along their periphery, and the sheet-like polymer is released from the cast.

[25] An acrylic resin laminate having a cured layer laminated on at least one surface of an acrylic resin sheet that is obtained by using an acrylic resin composition which contains an acrylic polymer (A-1) having 50 to 100% by mass of a methyl methacrylate unit and 0 to 50% by mass of other vinyl monomer unit and an olefin-alkyl (meth)acrylate copolymer (B).

[26] The acrylic resin laminate described in above [25], in which the olefin-alkyl (meth)acrylate copolymer (B) is an ethylene-alkyl (meth)acrylate copolymer (B-1).

[27] The acrylic resin laminate described in above [26], in which the ethylene-alkyl (meth)acrylate copolymer (B-1) is an ethylene-alkyl acrylate copolymer (B-2).

[28] The acrylic resin laminate described in above [25], in which the other vinyl monomer unit is at least one selected from a (meth)acrylic acid ester unit having an alicyclic hydrocarbon group with 6 to 20 carbon atoms, a (meth) acrylic acid ester unit having a linear or branched hydrocarbon group with 3 to 10 carbon atoms, and a monomer unit having two or more ethylenically unsaturated bonds in the monomer.

[29] The acrylic resin laminate described in above [28], in which the olefin-alkyl (meth)acrylate copolymer (B) is an ethylene-alkyl (meth)acrylate copolymer (B-1).

[30] The acrylic resin laminate described in above [29], in which the ethylene-alkyl (meth)acrylate copolymer (B-1) is an ethylene-alkyl acrylate copolymer (B-2).

[31] The acrylic resin laminate described in above [27], in which a content of the ethylene-alkyl acrylate copolymer (B-2) is 0.002 to 0.7 parts by mass based on 100 parts by mass of the acrylic polymer (A-1) in the acrylic resin composition.

[32] The acrylic resin laminate described in above [30], in which a content of the ethylene-alkyl acrylate copolymer (B-2) is 0.002 to 0.7 parts by mass based on 100 parts by mass of the acrylic polymer (A-1) in the acrylic resin composition.

[33] The acrylic resin laminate described in above [31], in which a content of the ethylene-alkyl acrylate copolymer (B-2) is 0.01 to 0.1 parts by mass based on 100 parts by mass of the acrylic polymer (A-1) in the acrylic resin composition.

[34] An acrylic resin laminate having a cured layer laminated on at least one surface of the acrylic resin sheet described in any one of above [12], [13], and [15] to [18].

[35] An acrylic resin laminate having a cured layer laminated on at least one surface of the acrylic resin sheet described in above [14].

[36] A method of manufacturing the acrylic resin laminate described in any one of above [27], [31], [33], and [35], in which,
as a cast, a cast formed by two plates that are oppositely aligned at a predetermined interval and a sealing material placed along their periphery, and having a cured layer formed on the inner surface of the cast of at least one plate is used,
as a polymerizable raw material, a raw material composition (1) containing a monomer component (a) containing methyl methacrylate or a monomer mixture having methyl methacrylate and other vinyl monomers and the ethylene-alkyl acrylate copolymer (B-2), or a raw material composition (2) containing syrup (1) obtained by polymerizing a part of the monomer component (a) and the ethylene-alkyl acrylate copolymer (B-2) is used, and the following step 1 and step 2 are included:
[step 1]: a step of producing a sheet-like polymer by polymerization-curing the polymerizable raw material after injecting it into the cast and, at the same time, transferring the cured layer on the sheet-like polymer to produce a laminate
[step 2]: a step of releasing the laminate from the cast.

[37] A method of manufacturing the acrylic resin laminate described in above [34], in which,
as a cast, a cast formed by two plates that are oppositely aligned at a predetermined interval and a sealing material placed along their periphery and having a cured layer formed on the inner surface of the cast of at least one plate is used,
as a polymerizable raw material, a raw material composition (1) containing a monomer component (a) containing methyl methacrylate or a monomer mixture having methyl methacrylate and other vinyl monomers and the ethylene-alkyl acrylate copolymer (B-2), or a raw material composition (2) containing syrup (1) obtained by polymerizing a part of the monomer component (a) and the ethylene-alkyl acrylate copolymer (B-2) is used, and the following step 1 and step 2 are included:
[step 1]: a step of producing a sheet-like polymer by polymerization-curing the polymerizable raw material after injecting it into the cast and, at the same time, transferring the cured layer on the sheet-like polymer to produce a laminate
[step 2]: a step of releasing the laminate from the cast.

[38] A method of manufacturing the acrylic resin laminate described in any one of above [27], [31], [33] and [35], in which,
as a cast, a cast formed by two plates that are oppositely aligned at a predetermined interval and a sealing material placed along their periphery is used,
as a polymerizable raw material, a raw material composition (1) containing a monomer component (a) containing methyl methacrylate or a monomer mixture having methyl methacrylate and other vinyl monomers and the ethylene-alkyl acrylate copolymer (B-2), or a raw material composition (2) containing syrup (1) obtained by polymerizing a part of the monomer component (a) and the ethylene-alkyl acrylate copolymer (B-2) is used, and the following step 1 and step 2 are included:
[step 1]: a step of producing a sheet-like polymer by polymerization-curing the polymerizable raw material after injecting it into the cast and releasing the sheet-like polymer from the cast to give an acrylic resin sheet
[step 2]: a step of coating a curable composition on at least one surface of the acrylic resin sheet and forming a cured layer by curing to produce a laminate.

[39] A method of manufacturing the acrylic resin laminate described in above [34], in which,
as a cast, a cast formed by two plates that are oppositely aligned at a predetermined interval and a sealing material placed along their periphery is used,
as a polymerizable raw material, a raw material composition (1) containing a monomer component (a) containing methyl methacrylate or a monomer mixture having methyl methacrylate and other vinyl monomers and the ethylene-alkyl acrylate copolymer (B-2), or a raw material composition (2) containing syrup (1) obtained by polymerizing a part of the monomer component (a) and the ethylene-alkyl acrylate copolymer (B-2) is used, and the following step 1 and step 2 are included:
[step 1]: a step of producing a sheet-like polymer by polymerization-curing the polymerizable raw material after injecting it into the cast and releasing the sheet-like polymer from the cast to give an acrylic resin sheet

[step 2]: a step of coating a curable composition on at least one surface of the acrylic resin sheet and forming a cured layer by curing to produce a laminate.

[40] A method of manufacturing the acrylic resin laminate described in any one of above [27], [31], [33] and [35], in which, as a cast, a cast formed by two plates that are oppositely aligned at a predetermined interval and a sealing material placed along their periphery and having a cured layer formed on the inner surface of the cast of at least one plate is used, as a polymerizable raw material, a raw material composition (3) containing syrup (2) obtained by polymerizing a part of a mixture containing a monomer component (a) containing methyl methacrylate or a monomer mixture having methyl methacrylate and other vinyl monomers and the ethylene-alkyl acrylate copolymer (B-2) is used, and the following step 1 and step 2 are included:

[step 1]: a step of producing a sheet-like polymer by polymerization-curing the polymerizable raw material after injecting it into the cast and, at the same time, transferring the cured layer on the sheet-like polymer to produce a laminate

[step 2]: a step of releasing the laminate from the cast.

[41] A method of manufacturing the acrylic resin laminate described in above [34], in which, as a cast, a cast formed by two plates that are oppositely aligned at a predetermined interval and a sealing material placed along their periphery and having a cured layer formed on the inner surface of the cast of at least one plate is used, as a polymerizable raw material, a raw material composition (3) containing syrup (2) obtained by polymerizing a part of a mixture containing a monomer component (a) containing methyl methacrylate or a monomer mixture having methyl methacrylate and other vinyl monomers and the ethylene-alkyl acrylate copolymer (B-2) is used, and the following step 1 and step 2 are included:

[step 1]: a step of producing a sheet-like polymer by polymerization-curing the polymerizable raw material after injecting it into the cast and, at the same time, transferring the cured layer on the sheet-like polymer to produce a laminate

[step 2]: a step of releasing the laminate from the cast.

[42] A method of manufacturing the acrylic resin laminate described in any one of above [27], [31], [33] and [35], in which, as a cast, a cast formed by two plates that are oppositely aligned at a predetermined interval and a sealing material placed along their periphery is used, as a polymerizable raw material, a raw material composition (3) containing syrup (2) obtained by polymerizing a part of a mixture containing a monomer component (a) containing methyl methacrylate or a monomer mixture having methyl methacrylate and other vinyl monomers and the ethylene-alkyl acrylate copolymer (B-2) is used, and the following step 1 and step 2 are included:

[step 1]: a step of producing a sheet-like polymer by polymerization-curing the polymerizable raw material after injecting it into the cast and releasing the sheet-like polymer from the cast to give an acrylic resin sheet

[step 2]: a step of coating a curable composition on at least one surface of the acrylic resin sheet and forming a cured layer by curing to produce a laminate.

[43] A method of manufacturing the acrylic resin laminate described in above [34], in which, as a cast, a cast formed by two plates that are oppositely aligned at a predetermined interval and a sealing material placed along their periphery is used, as a polymerizable raw material, a raw material composition (3) containing syrup (2) obtained by polymerizing a part of a mixture containing a monomer component (a) containing methyl methacrylate or a monomer mixture having methyl methacrylate and other vinyl monomers and the ethylene-alkyl acrylate copolymer (B-2) is used, and the following step 1 and step 2 are included:

[step 1]: a step of producing a sheet-like polymer by polymerization-curing the polymerizable raw material after injecting it into the cast and releasing the sheet-like polymer from the cast to give an acrylic resin sheet

[step 2]: a step of coating a curable composition on at least one surface of the acrylic resin sheet and forming a cured layer by curing to produce a laminate.

Advantageous Effects of Invention

According to the invention, an acrylic resin sheet and an acrylic resin laminate having excellent transparency and impact resistance are provided. In addition, the acrylic resin sheet and acrylic resin laminate provided by the invention are suitable for optical applications like a display front panel.

BRIEF DESCRIPTION OF DRAWINGS

FIG. 1 is a diagram illustrating a method for measuring a water absorption displacement amount in an acrylic resin sheet.

DESCRIPTION OF EMBODIMENTS

Hereinbelow, embodiments of the invention are described. Meanwhile, as described herein, "(meth)acrylate" means acrylate or methacrylate, "(meth)acryl" means acryl or methacryl, and "(meth)acryloyloxy" means acryloyloxy or methacryloyloxy.

[Acrylic Resin Composition]

The acrylic resin composition of the invention is an acrylic resin composition containing 100 parts by mass of an acrylic polymer (A) having a methyl methacrylate unit and 0.002 to 0.7 parts by mass of an olefin-alkyl (meth)acrylate copolymer (B). Hereinbelow, the methyl methacrylate and methyl methacrylate unit may be referred to as "MMA" and "MMA unit", respectively.

[Acrylic Polymer (A)]

The acrylic polymer (A) of the invention is a homopolymer consisting of a methyl methacrylate unit or a copolymer consisting of a methyl methacrylate unit and "other vinyl monomer unit" (that is, a vinyl monomer unit excluding an MMA unit). From the viewpoint of impact resistance, transparency, mechanical strength, weather resistance, and moldability, the acrylic polymer (A) is preferably an acrylic polymer (A-1) having 50 to 100% by mass of the methyl methacrylate unit and 0 to 50% by mass of "other vinyl monomer unit".

Specific examples of "other vinyl monomer" as a component of "other vinyl monomer unit" include the monomers described below: (meth)acrylic acid esters such as methyl acrylate, ethyl (meth)acrylate, isopropyl (meth)acrylate, t-butyl (meth)acrylate, i-butyl (meth)acrylate, n-butyl (meth)acrylate, cyclohexyl (meth)acrylate, bornyl (meth)

acrylate, norbornyl (meth)acrylate, isobornyl (meth)acrylate, adamantyl (meth)acrylate, dimethyl adamantyl (meth)acrylate, methyl cyclohexyl (meth)acrylate, norbornyl methyl (meth)acrylate, menthyl (meth)acrylate, penthyl (meth)acrylate, dicyclopentanyl (meth)acrylate, dicyclopentenyl (meth)acrylate, dicyclopentenyl oxyethyl (meth)acrylate, cyclodecyl (meth)acrylate, 4-t-butylcyclohexyl (meth)acrylate, and trimethyl cyclohexyl (meth)acrylate; unsaturated carboxylic acids such as (meth)acrylic acid, maleic acid, and itaconic acid; acid anhydrides such as maleic anhydride and itaconic anhydride; maleimide derivatives such as N-phenyl maleimide and N-cyclohexyl maleimide; vinyl esters such as vinyl acetate and vinyl benzoate; vinyl chloride, vinylidene chloride, and derivatives thereof; nitrogen-containing monomers such as methacryl amide and acrylonitrile; epoxy group-containing monomers such as (meth)acrylic acid glycidyl acrylate; and aromatic compounds having an ethylenically unsaturated bond in the molecule such as styrene and α-methyl styrene. The following monomers may be also used: alkane diol di(meth)acrylate such as ethylene glycol di(meth)acrylate, 1,2-propylene glycol di(meth)acrylate, 1,3-butylene glycol di(meth)acrylate, 1,6-hexane diol di(meth)acrylate, and neopentyl glycol di(meth)acrylate; polyoxyalkylene glycol di(meth)acrylate such as diethylene glycol di(meth)acrylate, dipropylene glycol di(meth)acrylate, triethylene glycol di(meth)acrylate, tetraethylene glycol di(meth)acrylate, and polyethylene glycol di(meth)acrylate; polyfunctional polymerizable compounds having at least two ethylenically unsaturated bonds in the molecule such as divinyl benzene; and unsaturated polyester prepolymers derived from at least one polyhydric carboxylic acid containing an ethylenically unsaturated polycarboxylic acid and at least one diol. In particular, the alkane diol di(meth)acrylate is preferred in that it can enhance heat resistance of the acrylic resin sheet. Those "other vinyl monomer" may be used either singly or in combination of two or more types.

Further, from the viewpoint of suppressing distortion of the acrylic resin sheet caused by water absorption, the "other vinyl monomer" is preferably at least one selected from a (meth)acrylic acid ester having an alicyclic hydrocarbon group with 6 to 20 carbon atoms, a (meth)acrylic acid ester having a linear or branched hydrocarbon group with 3 to 10 carbon atoms, and a monomer having two or more ethylenically unsaturated bonds in the molecule.

[Olefin-alkyl (Meth)acrylate Copolymer (B)]

Examples of the olefin as a component material of the olefin unit constituting the olefin-alkyl (meth)acrylate copolymer (B) (hereinbelow, it may be referred to as "copolymer (B)") of the invention include ethylene, propylene, isoprene, and butadiene.

Examples of the alkyl (meth)acrylate as a component material of an alkyl (meth)acrylate unit constituting the copolymer (B) include the following monomers: methyl (meth)acrylate, ethyl (meth)acrylate, isopropyl (meth)acrylate, t-butyl (meth)acrylate, i-butyl (meth)acrylate, n-butyl (meth)acrylate, cyclohexyl (meth)acrylate, bornyl (meth)acrylate, norbornyl (meth)acrylate, isobornyl (meth)acrylate, adamantyl (meth)acrylate, dimethyl adamantyl (meth)acrylate, methyl cyclohexyl (meth)acrylate, norbornyl methyl (meth)acrylate, menthyl (meth)acrylate, fenchyl (meth)acrylate, dicyclopentanyl (meth)acrylate, dicyclopentenyl (meth)acrylate, dicyclopentenyl oxyethyl (meth)acrylate, cyclodecyl (meth)acrylate, 4-t-butylcyclohexyl (meth)acrylate, and trimethyl cyclohexyl (meth)acrylate.

From the viewpoint of transparency and impact resistance of the acrylic resin sheet, the copolymer (B) is preferably the ethylene-alkyl (meth)acrylate copolymer (B-1), more preferably the ethylene-alkyl acrylate copolymer (B-2), and particularly preferably an ethylene-methyl acrylate copolymer. The copolymer may be a copolymer of acid anhydride such as maleic anhydride and itaconic anhydride. Further, the copolymer may be either a random copolymer or a block copolymer.

The mixing amount of the copolymer (B) in the acrylic resin composition of the invention is 0.002 to 0.7 parts by mass based on 100 parts by mass of the acrylic polymer (A). When the mixing amount of the copolymer (B) is 0.002 parts by mass or more, the impact resistance of the acrylic resin sheet is improved. Further, when the mixing amount of the copolymer (B) is 0.7 parts by mass or less, transparency of the acrylic resin sheet is good. The addition amount of the copolymer (B) is preferably 0.02 to 0.5 parts by mass based on 100 parts by mass of the acrylic polymer (A).

Based on 100% by mass of the total monomer units, the alkyl acrylate unit is preferably contained in an amount of 15 to 40% by mass in the copolymer (B). When the alkyl acrylate unit is contained in an amount of 15% by mass or more, the copolymer (B) has excellent solubility for MMA and the acrylic resin sheet has excellent transparency. Further, when the alkyl acrylate unit is contained in an amount of 40% by mass or less, the acrylic resin sheet has excellent transparency and impact resistance.

Exemplary shape of the acrylic resin composition of the invention includes powder shape and pellet shape.

[Method for Producing Acrylic Resin Composition]

Method for producing an acrylic resin composition having powder shape or pellet shape is preferably a method of polymerizing the monomer component (a) containing MMA or a monomer mixture containing MMA and "other vinyl monomer" in the presence of the ethylene-alkyl acrylate copolymer (B-2), from the viewpoint of impact resistance and transparency of the acrylic resin sheet. Examples of the polymerization method include bulk polymerization, solution polymerization, emulsion polymerization, and suspension polymerization. From the viewpoint of cost relating to production of an acrylic resin composition, environmental burden caused by use of a solvent, productivity of an acrylic resin composition, and transparency, bulk polymerization is preferable.

Examples of the method for producing the powder shape composition include a method of polymerizing MMA dispersed in water using a dispersion stabilizer, followed by washing and dehydration treatment and vacuum drying to obtain a powder shape composition as described in JP 2006-193647 A. Further, examples of the method for producing the pellet shape composition include a method of obtaining pellets by extruding powder shape composition obtained by the above method and a method of obtaining pellets by bulk-polymerizing MMA in a reactor and performing extrusion with separation and elimination of unreacted MMA as described in JP 2000-26507 A.

As a polymerization reaction mode, a known mode such as radical polymerization and anion polymerization may be used. In case of the radical polymerization, examples of a radical polymerization initiator added to the monomer component (a) include, although not specifically limited, an azo-based polymerization initiator such as 2,2'-azobis(4-methoxy-2,4-dimethylvaleronitrile), 2,2'-azobisisobutyronitrile, and 2,2'-azobis-(2,4-dimethylvaleronitrile); and an organic peroxide-based polymerization initiator such as lauoryl peroxide, diisopropyl peroxydicarbonate, benzoyl peroxide, bis(4-t-butylcyclohexyl) peroxydicarbonate, t-butyl peroxyneodecanoate, and t-hexyl peroxypivalate. It may be used either singly or in combination of two or more types. The addition amount of the radical polymerization initiator is preferably 0.01 to 1 part by mass based on 100 parts by mass of the total monomers.

The polymerization temperature is, although not specifically limited, preferably 40° C. or higher, and more preferably 50° C. or higher. Further, it is preferably 180° C. or lower and more preferably 150° C. or lower. The polymerization time is suitably determined in accordance with progress of the polymerization curing.

During the polymerization, various known additives such as a chain transfer agent for controlling molecular weight, a stabilizer such as an anti-oxidant and an UV absorbing agent, a flame retardant, a dye, a pigment, and a releasing agent may be added.

[Acrylic Resin Sheet]

Examples of the acrylic resin sheet of the invention include a resin sheet containing the acrylic resin composition described above. Further examples of the acrylic resin sheet of the invention include an acrylic resin sheet which has a haze value of 0.5% or less based on JIS K 7136, 50% impact-puncture height of 350 mm or more in a falling ball impact test based on JIS K 7211 under the conditions described below, and a sheet thickness of 2 mm or less.

The falling ball test is performed according to the method described below, and the height at the time of having rupture in 50% of the test specimen is calculated by using a method of calculating 50% rupture height as described in JIS K 7211.

<Method for Falling Ball Test>
Size of test specimen: square with single side length of 50 mm
Size of supporting board: a 5 mm-thick acrylic plate having a round hole with diameter of 20 mm
Size of falling ball: a ball made of stainless steel (ball diameter: 20.0 mmϕ, mass: 35.9 g)
Temperature of measurement atmosphere: 23° C.
Relative humidity of measurement atmosphere: 50%,
Time for keeping a test specimen before measurement in measurement atmosphere: 24 hours or longer, and
Test method: Test order described in JIS K 7211-1 is followed. The test specimen is placed on the top of the supporting board such that the center of the hole in the supporting board is in match with the center of the test specimen. Right and left sides of the test specimen are fixed on the supporting board using a cellophane tape, and then a stainless steel ball is dropped onto the center of the test specimen under the conditions including a temperature of 23° C. and a relative humidity of 50%. The falling height is changed by 25 mm, and the test number for each falling height is 20.

The acrylic resin sheet of the invention is suitable for optical applications like a display front panel. With regard to the transparency of the acrylic resin sheet, a haze value of 2% or lower is preferable from the viewpoint of recognizability of a display. A haze value of 0.5% or less is more preferable. With regard to the impact resistance of the acrylic resin sheet, 50% impact-puncture height according to the aforementioned test method is preferably 200 mm or higher and more preferably 350 mm or higher from the viewpoint of protecting liquid crystal of a display.

Examples of the acrylic resin sheet having a haze value of 0.5% or lower include an acrylic resin sheet having an elastomer with an alkyl acrylate unit dispersed in an acrylic resin matrix, which has a haze value of 0.5% or lower, 50% impact-puncture height of 350 mm or higher, and a sheet thickness of 2 mm or less.

Specific examples of the acrylic resin sheet having a haze value of 0.5% or lower include an acrylic resin sheet which has a haze value of 0.5% or less, 50% impact-puncture height of 350 mm or more, and a sheet thickness of 2 mm or less, in which the olefin-alkyl (meth)acrylate copolymer (B) is dispersed in the acrylic polymer (A) containing an acrylic resin composition which contains 100 parts by mass of the acrylic polymer (A-1) and 0.02 to 0.5 parts by mass of the olefin-alkyl (meth)acrylate copolymer (B) such as ethylene-methyl acrylate.

From the viewpoint of the transparency and impact resistance of the acrylic resin sheet of the invention, examples of the copolymer (B) as a constitutional component is preferably the ethylene-alkyl (meth)acrylate copolymer (B-1), more preferably the ethylene-alkyl acrylate copolymer (B-2), and particularly preferably an ethylene-methyl acrylate copolymer. The copolymer may be a copolymer of acid anhydride such as maleic anhydride and itaconic anhydride. Further, the copolymer may be either a random copolymer or a block copolymer.

The mixing amount of the copolymer (B) in the acrylic resin sheet of the invention is preferably 0.002 to 0.7 parts by mass based on 100 parts by mass of the acrylic polymer (A). When the mixing amount of the copolymer (B) is 0.002 parts by mass or more, the impact resistance of the acrylic resin sheet is improved. Further, when it is 0.7 parts by mass or less, transparency of the acrylic resin sheet is good. The mixing amount of the copolymer (B) is more preferably 0.02 to 0.5 parts by mass.

Further, from the viewpoint of suppressing distortion of the acrylic resin sheet caused by water absorption, "other vinyl monomer unit" in the acrylic polymer (A) is at least one selected from a (meth)acrylic acid ester unit having an alicyclic hydrocarbon group with 6 to 20 carbon atoms, a (meth)acrylic acid ester unit having a linear or branched hydrocarbon group with 3 to 10 carbon atoms, and a monomer unit having two or more ethylenically unsaturated bonds in the molecule. The degree of distortion of the acrylic resin sheet caused by water absorption can be expressed as water absorption displacement amount y.

<Method for Measuring Water Absorption Displacement Amount>

The water absorption displacement amount y is measured by the method described below. First of all, a test specimen of the sheet with length of 200 mm and width of 50 mm is kept for 24 hours under an environment including temperature of 85° C. and relative humidity of 85% while one end of the specimen (length: 50 mm) is fixed in a horizontal state with a fixing jig (see, FIG. 1). Subsequently, warpage amount (water absorption displacement amount) y in perpendicular direction of the other end of the test specimen that has not been fixed is measured.

The water absorption displacement amount of the acrylic resin sheet of the invention is preferably 45 mm or less. When the water absorption displacement amount is the same or less than that value, the shape of the front panel can be maintained for a long period of time under high temperature and high humidity condition when the acrylic resin sheet is used for optical applications like a display front panel.

[Method for Manufacturing Acrylic Resin Sheet]

The method for manufacturing the acrylic resin sheet of the invention is not particularly limited, and examples thereof include a cast polymerization method, an extrusion molding method, and an injection molding method. From the viewpoint of obtaining a transparent resin sheet, the cast polymerization method is preferable.

The cast polymerization method uses a cast formed by two plates that are oppositely aligned at a predetermined interval and a sealing material placed along their periphery, produces a sheet-like polymer by injecting polymerizable materials into the cast, followed by polymerization curing, and releases the sheet-like polymer from the cast. The cast polymerization method is a method particularly preferred for an application like optical applications which require transparency.

The cast for cast polymerization is not particularly limited, and any known cast may be used. Examples of the cast for obtaining a sheet-like resin molded product include a cast for cell casting and a cast for continuous casting. The cast for cell casting has a constitution, for example, in which two plates such as inorganic glass, a chrome-plated metal plate, and a stainless steel plate are oppositely aligned at a predetermined interval and a gasket is placed along their periphery so that a sealing space is formed with the plates and gasket. The cast for continuous casting has a constitution in which a sealing space is formed with a surface faced by a pair of endless belts running in the same direction at the same speed and a gasket running at the same speed as the endless belts at both sides of the surface.

Examples of the polymerizable material injected into a cast include the raw material composition (1), the raw material composition (2), and the raw material composition (3) as described below.

The raw material composition (1) is a composition which contains the monomer component (a) including MMA or a monomer mixture containing MMA and "other vinyl monomer" and the ethylene-alkyl acrylate copolymer (B-2).

The raw material composition (2) is a composition which contains the syrup (1) obtained by polymerizing part of the monomer component (a) including MMA or a monomer mixture containing MMA and "other vinyl monomer" and the ethylene-alkyl acrylate copolymer (B-2). The raw material composition (2) can be prepared by adding and dissolving the ethylene-alkyl acrylate copolymer (B-2) in the syrup (1) obtained by polymerizing part of the monomer component (a).

The raw material composition (3) is a composition which contains the syrup (2) obtained by polymerizing part of the raw material composition (1). The raw material composition (3) can be prepared by adding and dissolving the ethylene-alkyl acrylate copolymer (B-2) in the monomer component (a), followed by polymerizing part of the monomer component (a).

The syrup (1) and the syrup (2) used in the invention is a mixture of a monomer and a polymer, and it is a liquid with viscosity.

For preparing the syrup (1) or the syrup (2) by polymerizing part of the component (a), the polymerization ratio is preferably within the range of 5 to 45% by mass. When the polymerization ratio is 5% by mass or more, the time for polymerization curing during cast polymerization is shortened so that a defective appearance tends not to easily occur in the acrylic resin sheet. Further, when the polymerization ratio is 45% by mass or less, the syrup has suitable viscosity so that the handleability of the syrup tends to get improved. For shortening the polymerization curing time of the syrup and preventing easy occurrence of a defective appearance in the acrylic resin sheet to be obtained, it is preferable to make the polymerization ratio of the syrup as high as possible. On the other hand, considering the handleability of the syrup or dispersibility of the additives, it is better to have lower polymerization ratio of the syrup. From these points of view, the polymerization ratio of the syrup is particularly preferably in the range of 10 to 40% by mass.

The method for controlling the polymerization ratio of the polymerizable material to be in the range of 5 to 45% by mass is not particularly limited. A method of weighing and adding predetermined amount of the monomer component (a) or a composition containing the monomer component (a) and the copolymer (B-2) into a reactor equipped with a condenser, a thermometer and a stirrer, adding a polymerization initiator under heating and stirring, and processing the polymerization by keeping at predetermined temperature, followed by cooling may be exemplified.

To the obtained syrup or the raw material composition containing the syrup, a polymerization inhibitor is preferably added to avoid coloration or natural curing. Specific examples of the polymerization inhibitor include hydroquinone, hydroquinone monomethyl ether, 2,6-di-t-butyl-4-methylphenol, and 2,4-dimethyl-6-t-butyl phenol. It may be used either singly or in combination of two or more types, if necessary.

Examples of the polymerization mode for cast polymerization, which may be employed, include a known reaction mode such as radical polymerization and anionic polymerization. In particular, from the viewpoint of versatility of raw materials, easy management of production condition, and easy production using versatile facilities, the radical polymerization is preferable.

When the radical polymerization is employed, the aforementioned radical polymerization initiator and various additives may be added to polymerizable raw materials. The addition amount of the radical polymerization initiator is preferably 0.01 to 1 part by mass based on 100 parts by mass of the total monomers.

The polymerization temperature is, although not specifically limited, preferably 40° C. or higher, and more preferably 50° C. or higher. Further, it is preferably 180° C. or lower and more preferably 150° C. or lower. The polymerization time is suitably determined in accordance with progress of the polymerization curing.

With regard to the cast polymerization method of the invention, types of the polymerizable material injected into a cast are selected in accordance with characteristics that are required for the acrylic resin sheet. From the viewpoint of enhancing impact resistance and transparency of the acrylic resin sheet, the raw material composition (1) is most preferable followed by the raw material composition (3). Further, from the viewpoint of enhancing the productivity of the acrylic resin sheet, the raw material composition (3) is most preferable followed by the raw material composition (2).

[Acrylic Resin Laminate]

Examples of the acrylic resin sheet used for obtaining the acrylic resin laminate of the invention include at least one selected from an acrylic resin sheet obtained by using an acrylic resin composition containing the acrylic polymer (A) having MMA alone or MMA and other vinyl monomer unit and the olefin-alkyl (meth)acrylate copolymer (B) and an acrylic resin sheet having a haze value of 0.5% or less based on JIS K 7136, 50% impact-puncture height of 350 mm or more in a falling ball impact test based on JIS K 7211, and a sheet thickness of 2 mm or less.

The acrylic resin laminate of the invention is a laminate having a cured layer laminated on at least one surface of the acrylic resin sheet. The cured layer may be provided with various functions such as scratch resistance, an anti-reflecting property, an anti-glaring property, an anti-fouling property, an anti-static property, an anti-scattering property, viscosity, an adhesive property, and softness. The cured layer may be provided with at least one function of them.

Examples of the curable composition as a raw material of the cured layer which may be used include a curable composition containing a radical polymerization-based curable compound such as a UV curable composition described below and a curable composition containing a polycondensation type curable compound such as alkoxysilane and alkyl alkoxysilane. The curable composition is cured by radiation of active energy rays such as electronic beam, radioactive rays and UV rays or by heating. The curable compound may be used either singly or in combination of two or more types. Depending on a specific case, the active energy ray polymerization type curable compound and thermal polymerization type curable compound may be used in combination.

The curable composition is preferably a UV curable composition from the viewpoint of productivity and physical properties of the acrylic resin laminate. The cured layer is preferably a layer obtained by curing a UV curable composition with UV ray. As for the UV curable composition, a composition consisting of a compound having at least two (meth)acryloyloxy groups in the molecule and a photoinitiator is preferable from the viewpoint of the productivity of the acrylic resin laminate.

Examples of the compound having at least two (meth) acryloyloxy groups in the molecule include the following compounds: an esterified product obtained from polyhydric alcohol in an amount of 1 mol and (meth)acrylic acid or derivatives thereof in an amount of at least 2 mol and an esterified product obtained from polyhydric alcohol, polyhydric carboxylic acid or anhydride thereof, and (meth) acrylic acid or derivatives thereof Examples of the esterified product obtained from polyhydric alcohol in an amount of 1 mol and (meth)acrylic acid or derivatives thereof in an amount of at least 2 mol include the following compounds: di(meth)acrylate of polyethylene glycol such as diethylene glycol di(meth)acrylate, triethylene glycol di(meth)acrylate, and tetraethylene glycol di(meth)acrylate; di(meth)acrylate of alkyl diol such as 1,4-butane diol di(meth)acrylate, 1,6-hexane diol di(meth)acrylate, and 1,9-nonane diol di(meth)acrylate; and poly(meth)acrylate of polyol with three or more functionalities such as trimethylol propane tri(meth)acrylate, trimethylol ethane tri(meth)acrylate, pentaglycerol tri(meth)acrylate, pentaerythritol tri (meth)acrylate, pentaerythritol tetra(meth)acrylate, glycerin tri(meth)acrylate, dipentaerythritol tri(meth)acrylate, dipentaerythritol tetra(meth)acrylate, dipentaerythritol penta(meth)acrylate, dipentaerythritol hexa(meth)acrylate, tripentaerythritol tetra(meth)acrylate, tripentaerythritol penta (meth)acrylate, tripentaerythritol hexa(meth)acrylate, and tripentaerythritol hepta(meth)acrylate.

Examples of the combination of a polyhydric alcohol, polyhydric carboxylic acid or its anhydride, and (meth) acrylic acid or derivatives thereof include the following combinations: malonic acid/trimethylol ethane/(meth) acrylic acid, malonic acid/trimethylol propane/(meth)acrylic acid, malonic acid/glycerin/(meth)acrylic acid, malonic acid/pentaerythritol/(meth)acrylic acid, succinic acid/trimethylol ethane/(meth)acrylic acid, succinic acid/trimethylol propane/(meth)acrylic acid, succinic acid/glycerin/(meth) acrylic acid, succinic acid/pentaerythritol/(meth)acrylic acid, adipic acid/trimethylol ethane/(meth)acrylic acid, adipic acid/trimethylol propane/(meth)acrylic acid, adipic acid/ glycerin/(meth)acrylic acid, adipic acid/pentaerythritol/ (meth)acrylic acid, glutaric acid/trimethylol ethane/(meth) acrylic acid, glutaric acid/trimethylol propane/(meth)acrylic acid, glutaric acid/glycerin/(meth)acrylic acid, glutaric acid/ pentaerythritol/(meth)acrylic acid, sebacic acid/trimethylol ethane/(meth)acrylic acid, sebacic acid/trimethylol propane/ (meth)acrylic acid, sebacic acid/glycerin/(meth)acrylic acid, sebacic acid/pentaerythritol/(meth)acrylic acid, fumaric acid/trimethylol ethane/(meth)acrylic acid, fumaric acid/ trimethylol propane/(meth)acrylic acid, fumaric acid/glycerin/(meth)acrylic acid, fumaric acid/pentaerythritol/(meth) acrylic acid, itaconic acid/trimethylol ethane/(meth)acrylic acid, itaconic acid/trimethylol propane/(meth)acrylic acid, itaconic acid/glycerin/(meth)acrylic acid, itaconic acid/pentaerythritol/(meth)acrylic acid, maleic anhydride/trimethylol ethane/(meth)acrylic acid, maleic anhydride/trimethylol propane/(meth)acrylic acid, maleic anhydride/glycerin/ (meth)acrylic acid, and maleic anhydride/pentaerythritol/ (meth)acrylic acid.

Other specific examples of the compound having at least two (meth)acryloyloxy groups in the molecule include the following compounds: urethane (meth)acrylate obtained by reacting at least 3 moles of an acrylic monomer having an active hydrogen (for example, 2-hydroxyethyl(meth)acrylate, 2-hydroxypropyl(meth)acrylate, 2-hydroxy-3-methoxypropyl(meth)acrylate, N-methylol (meth)acrylamide, N-hydroxy(meth)acrylamide, 1,2,3-propanetriol-1,3-di (meth)acrylate, and 3-acryloyloxy-2-hydroxypropyl(meth) acrylate) per mole of polyisocyanate obtained by trimerization of diisocyanate (for example, trimethylol propanetoluylene diisocyanate, hexamethylene diisocyanate, tolylene diisocyanate, diphenylmethane diisocyanate, xylene diisocyanate, 4,4'-methylene bis(cyclohexylisocyanate), isophorone diisocyanate, and trimethylhexamethylene diisocyanate); poly[(meth)acryloyloxyethylene]isocyanurate such as di(meth)acrylate or tri(meth)acrylate of tris(2-hydroxyethyl)isocyanuric acid; epoxypoly(meth)acrylate; and urethane poly(meth)acrylate.

Specific examples of the photoinitiator used for a UV curable composition include the following compounds: carbonyl compounds such as benzoin, benzoin methyl ether, benzoin ethyl ether, benzoin isopropyl ether, benzoin isobutyl ether, acetoin, butyroin, toluoyn, benzil, benzophenone, p-methoxy benzophenone, 2,2-diethoxy acetophenone, α,α-dimethoxy-α-phenyl acetophenone, methylphenyl glyoxylate, ethylphenyl glyoxylate, 4,4'-bis(dimethylamino)benzophenone, 1-hydroxy-cyclohexyl-phenyl-ketone, and 2-hydroxy-2-methyl-1-phenylpropane-1-one; sulfur compounds such as tetramethyl thiuram monosulfide and tetramethyl thiuram disulfide; and phosphorus compounds such as 2,4,6-trimethylbenzoyl diphenyl phosphine oxide, bis(2,4, 6-trimethylbenzoyl)-phenyl phosphine oxide, and benzoyl diethoxy phosphine oxide.

The acrylic resin composition for constituting the acrylic resin sheet is preferably an acrylic resin composition which contains the acrylic polymer (A-1) having 50 to 100% by mass of MMA unit and 0 to 50% by mass of "other vinyl monomer unit" and the olefin-alkyl (meth)acrylate copolymer (B). The olefin-alkyl (meth)acrylate copolymer (B) is preferably the ethylene-alkyl (meth)acrylate copolymer (B-1), and more preferably the ethylene-alkyl acrylate copolymer (B-2).

The "other vinyl monomer unit" in the acrylic polymer (A-1) having MMA unit is preferably at least one selected from a (meth)acrylic acid ester unit having an alicyclic hydrocarbon group with 6 to 20 carbon atoms, a (meth) acrylic acid ester unit having a linear or branched hydrocarbon group with 3 to 10 carbon atoms, and a monomer unit having two or more ethylenically unsaturated bonds in the molecule.

The content of the ethylene-alkyl acrylate copolymer (B-2) based on 100 parts by mass of the acrylic polymer (A-1) in the acrylic resin composition is preferably 0.002 to 0.7 parts by mass, and more preferably 0.01 to 0.1 parts by mass.

From the viewpoint of surface hardness and appearance of the acrylic resin laminate, thickness of the cured layer is preferably from 1 μm to 100 μm, and more preferably from 1 μm to 30 μm.

The acrylic resin laminate of the invention may have a functional layer other than the cured layer described above between the acrylic resin sheet and cured layer or on one or both surfaces of the cured layer. Specific examples of the function of the functional layer include an anti-reflecting property, an anti-glaring property, an anti-fouling property, an anti-static property, an anti-scattering property, viscosity, an adhesive property, and softness. The functional layer may be provided with at least one function of them. Further, one or more functional layers may be provided.

[Method for Manufacturing Acrylic Resin Laminate]

With regard to the method for manufacturing the acrylic resin laminate, a known method useful for laminating a cured layer on the surface of the acrylic resin sheet may be used. Examples of the method include (1) a transfer method and (2) a coating method described below.

(1) Transfer Method

The transfer method is a method in which, as a cast, a cast formed by two plates that are oppositely aligned at a predetermined interval and a sealing material placed along their periphery and having a cured layer formed on the inner surface of the cast of at least one plate is used, and the following step 1 and step 2 are included:

[step 1]: a step of producing a sheet-like polymer by polymerization curing the polymerizable raw material after injecting it into the cast and, at the same time, transferring the cured layer on the sheet-like polymer to produce a laminate

[step 2]: a step of releasing the laminate from the cast.

(2) Coating Method

The coating method is a method in which, as a cast, a cast formed by two plates that are oppositely aligned at a predetermined interval and a sealing material placed along their periphery is used, and the following step 1 and step 2 are included:

[step 1]: a step of producing a sheet-like polymer by polymerization curing the polymerizable raw material after injecting it into the cast and releasing the sheet-like polymer from the cast to give an acrylic resin sheet

[step 2]: a step of coating a curable composition on at least one surface of the acrylic resin sheet and forming a cured layer by curing to produce a laminate.

The cured layer for the transfer method or coating method may be formed by curing the aforementioned curable composition or the like. The cured layer for the transfer method is more preferably a layer obtained by curing a UV curable composition with UV rays.

The addition amount of the photoinitiator in 100% by mass of the UV curable composition is preferably 0.1% by mass or more from the viewpoint of curability by UV radiation. From the viewpoint of band color caused by UV rays, it is preferably 10% by mass or less. Further, two or more types of the photoinitiator may be used in combination.

The curable composition is preferably used as a paint containing a curable composition. To the paint, various components such as a leveling agent, conductive substances, inorganic microparticles, and photostabilizers (for example, UV absorbing agent and HALS) may be added as necessary.

Total addition amount of the various additives in 100% by mass of the curable composition is preferably 10% by mass or less from the viewpoint of transparency of the laminate.

According to the transfer method of the invention, the acrylic resin laminate is manufactured by the same operations as those for manufacturing an acrylic resin sheet by a cast polymerization method except that, as a cast, a cast having a cured layer formed on the inner surface of the cast of at least one plate is used. Specifically, as a polymerizable material, the aforementioned raw material composition (1), the raw material composition (2), or the raw material composition (3) is injected into a cast.

Form the viewpoint of productivity, appearance, and transparency of the acrylic resin laminate, the coating method of the invention is preferably used as a method of manufacturing an acrylic resin laminate. Further, when the transfer method of the invention is used as a method for manufacturing the acrylic resin laminate, it is more preferable from the viewpoint of hardness, transparency, and impact resistance of the acrylic resin laminate.

According to the transfer method of the invention, the polymerizable material to be injected into a cast is preferably selected depending on characteristics that are required for the acrylic resin laminate. From the viewpoint of improving impact resistance of the acrylic resin laminate, the raw material composition (3) is most preferable followed by the raw material composition (2). From the viewpoint of enhancing transparency of the acrylic resin laminate, the raw material composition (1) is most preferable followed by the raw material composition (3). Further, from the viewpoint of enhancing productivity of the acrylic resin laminate, the raw material composition (2) and the raw material composition (3) are most preferable, followed by the raw material composition (1).

EXAMPLES

Hereinbelow, the invention is described in view of Examples. In the following descriptions, "parts" indicate "parts by mass". In addition, abbreviated symbols of the compounds used in Examples and Comparative Examples are listed in Table 1. Further, in Examples, an ethylene-methyl acrylate copolymer (EMA) was used as the olefin-alkyl (meth)acrylate copolymer (B). Before describing Examples, various evaluation methods, preparation examples of EMA dispersion, and preparation examples of syrup are described.

[1] Evaluation Method (1) Total Light Transmittance and Haze

A total light transmittance and a haze value of the acrylic resin sheet are measured by using HAZE METER NDH2000 (trade name) manufactured by NIPPON DENSHOKU INDUSTRIES CO., LTD in view of the measurement method of JIS K7136.

(2) Falling Ball Test (Evaluation of Impact Resistance)

Evaluation of impact resistance by a falling ball test is performed according to the method described above.

(3) Anti-scratch Property

A circular pad with a diameter of 25.4 mm added with #000 steel wool is placed on the surface of the acrylic resin laminate and the scratch treatment is performed by moving the pad back and forth 100 times within a distance of 20 mm under a load of 9.8 N. "ΔHaze (%)" obtained from the following equation is an indicator of anti-scratch property.

[ΔHaze (%)]=[Haze value after scratch (%)]−[Haze value before scratch (%)]

(4) Water Absorption Displacement Amount

The water absorption displacement amount is measured by the method described above.

[2] Method for Preparing 1% Dispersion of EMA

The 1% dispersion of EMA used in Examples is prepared by the following method. First, to a reactor (flask) equipped with a condenser, a thermometer, and a stirrer, 99 parts of MMA are added and heating is initiated under stirring. Subsequently, when the liquid temperature reaches 80° C., one part of EMA is added and stirred for 30 min, and the liquid temperature is cooled to a room temperature.

[3] Examples for Preparing Syrup (1) Preparation of Syrup 1

100 parts of MMA were added to a reactor equipped with a condenser, a thermometer, and a stirrer. After bubbling with nitrogen gas, heating was initiated under stirring. When the liquid temperature reaches 80° C., 0.1 parts of 2,2'-azobis-(2,4-dimethylvaleronitrile) were added as a radical polymerization initiator. The liquid temperature was increased again to 100° C. and it was maintained at the same temperature for 12 min. After that, the liquid temperature was cooled to a room temperature to give the syrup 1. The content of the polymer in the syrup 1 was about 21% by mass.

(2) Preparation of Syrup 2-1 to Syrup 2-8

100 parts of MMA and EMA with the type and the amount listed in Table 2 were added to a reactor equipped with a condenser, a thermometer, and a stirrer. After bubbling with nitrogen gas, heating was initiated under stirring. When the liquid temperature reaches 80° C., 0.06 parts of t-hexyl peroxypivalate were added as a radical polymerization initiator. The liquid temperature was increased again to 100° C. and it was maintained at the same temperature for 10 min. After that, the liquid temperature was cooled to a room temperature. Accordingly, eight kinds of syrup were obtained. The content of the polymer in the syrup was about 21% by mass for all syrups.

(3) Preparation of Syrup 3

A mixture of MMA, IBXMA, IBXA, TBMA unit, and BA was added to a reactor equipped with a condenser, a thermometer, and a stirrer. After bubbling with nitrogen gas, heating was initiated under stirring. The use amount of the monomers is listed in Table 3. When the liquid temperature reaches 60° C., 0.1 parts of t-hexyl peroxypivalate were added as a radical polymerization initiator. The liquid temperature was increased again to 100° C. and it was maintained at the same temperature for 13 min. After that, the liquid temperature was cooled to a room temperature to give the syrup 3. The content of the polymer in the syrup 3 was about 31% by mass.

(4) Preparation of Syrup 4-1 to Syrup 4-7

A mixture of EMA, MMA, IBXMA, IBXA, TBMA, and BA was added to a reactor equipped with a condenser, a thermometer, and a stirrer. After bubbling with nitrogen gas, heating was initiated under stirring. The type of EMA and the use amount of the monomers are listed in Table 3. When the liquid temperature reaches 60° C., 0.1 parts of t-hexyl peroxypivalate were added as a radical polymerization initiator. The liquid temperature was increased again to 100° C. and it was maintained at the same temperature for 13 min. After that, the liquid temperature was cooled to a room temperature. Accordingly, seven kinds of syrup were obtained. The content of the polymer in the syrup was about 30% by mass for all syrups.

Example 1

Two stainless steel plates (SUS304, a height of 300 mm, a width of 300 mm, and a thickness of 300 mm) were placed to face each other and their periphery is sealed with a gasket composed of soft polyvinyl chloride to manufacture a cast 1 for cast polymerization. A polymerizable material containing a mixture containing 0.1 parts of EB440H dissolved in 100 parts of MMA, 0.2 parts of t-hexyl peroxypivalate, and 0.01 parts of sodium dioctyl sulfosuccinate was prepared. The polymerizable material was injected into the cast and the interval between two opposite stainless steel plates was adjusted to 1.6 mm. Subsequently, the cast was heated for 1 hour in a water bath at 80° C. and heated again for 1 hour with a hot air furnace at 130° C. for polymerization curing of the polymerizable material in the cast. As a result, a sheet-like polymer was obtained. After that, the cast was cooled and the sheet-like polymer was released from the stainless steel plate to give an acrylic resin sheet with a sheet thickness of 1 mm. The evaluation results are given in Table 4.

Examples 2 to 8

The cast polymerization was performed in the same manner as Example 1 except that the polymerizable materials are changed as listed in Table 4. As a result, an acrylic resin sheet having a sheet thickness of 1 mm was prepared. The evaluation results are given in Table 4.

Comparative Example 1

A polymerizable material containing 100 parts of MMA, 0.3 parts of t-hexyl peroxypivalate, and 0.05 parts of sodium dioctyl sulfosuccinate was prepared. The cast polymerization was performed in the same manner as Example 1 except that the resulting polymerizable material is used. As a result, an acrylic resin sheet having a sheet thickness of 1 mm was prepared. The evaluation results are given in Table 4. As no copolymer (B) is used, the acrylic resin sheet exhibited small 50% impact-puncture height according to the falling ball test and showed poor impact resistance.

Comparative Example 2

The acrylic resin sheet was manufactured in the same manner as Example 1 except that the polymerizable materials are changed as listed in Table 4. In the resulting acrylic resin sheet, the content of the copolymer (B) is 1% by mass, which is excessively high, and thus it exhibits a high haze value and poor transparency.

Example 9

A polymerizable material containing the syrup 1 (70 parts), 29.5 parts of MMA, 0.5 parts of 1% EMA dispersion, 0.03 parts of EDMA, 0.3 parts of t-hexyl peroxypivalate, and 0.05 parts of sodium dioctyl sulfosuccinate was prepared. The cast polymerization was performed in the same manner as Example 1 except that the resulting polymerizable material is used. As a result, an acrylic resin sheet having a sheet thickness of 1 mm was prepared. The evaluation results are given in Table 5.

Examples 10 to 12

The cast polymerization was performed in the same manner as Example 9 except that the polymerizable materials are changed as listed in Table 5. As a result, an acrylic resin sheet having a sheet thickness of 1 mm was prepared. The evaluation results are given in Table 5.

Example 13

A polymerizable material containing the syrup 2-1 (70 parts), 30 parts of MMA, 0.03 parts of EDMA, 0.3 parts of t-hexyl peroxypivalate, and 0.05 parts of sodium dioctyl sulfosuccinate was prepared. The cast polymerization was performed in the same manner as Example 1 except that the resulting polymerizable material is used. As a result, an acrylic resin sheet having a sheet thickness of 1 mm was prepared. The evaluation results are given in Table 6.

Examples 14 to 18

The cast polymerization was performed in the same manner as Example 13 except that the polymerizable materials are changed as listed in Table 6. As a result, an acrylic resin sheet having a sheet thickness of 1 mm was prepared. The evaluation results are given in Table 6.

Example 19

On a stainless steel plate (SUS304, a height of 300 mm, a width of 300 mm, and a thickness of 300 mm), a UV curable composition containing TAS (50 parts), C6DA (50 parts), and BEE (2 parts) was coated. On the coated film, a polyethylene terephthalate film (PET film) having a thickness of 12 µm was overlaid and compressed to eliminate air bubbles from the coated film by removing the excess UV curable composition using a rubber roll having JIS hardness of 40° to have coated film thickness of 15 µm. The thickness of the coated film was calculated based on the supply amount of the UV curable composition and developed area (530 cm$^2$).

Subsequently, with speed of 0.3 m/min, the coated film was passed through 20 cm below the fluorescent UV ray lamp having output of 40 W (manufactured by Toshiba Lighting & Technology Corporation, trade name: FL40BL) while the PET film side is exposed on the top surface. Accordingly, the coated film was irradiated with UV light through the PET film and the UV curable composition was subjected to polymerization curing.

After that, the PET film was peeled off, and with speed of 3.0 m/min, the coated film was passed through 20 cm below the high pressure mercury lamp having output of 9.6 kW for UV irradiation while the coated film side is exposed on the top surface. Accordingly, it was further subjected to polymerization. As a result, a sheet-like body having a cured layer with thickness of 13 µm is formed on a stainless steel plate was obtained (hereinbelow, referred to as a "stainless steel plate attached with cured layer"). Meanwhile, thickness of the cured layer was obtained from a differential interference contrast microscopic image of the cross-section of an obtained laminate.

By using a separate stainless steel plate having the same size, a stainless steel plate attached with cured layer was obtained in the same manner as above.

The two stainless steel plates attached with cured layer were aligned to face each other such that each cured layer is present at the inner side. Their periphery was sealed with a gasket made of soft polyvinyl chloride to give a cast 2 for cast polymerization. The cast polymerization was performed in the same manner as Example 2 except that the resulting cast is used. As a result, an acrylic resin layer (acrylic resin sheet) is formed and, at the same time, the cured layer is transferred to the acrylic resin layer so that an acrylic resin laminate having a sheet thickness of 1 mm and a cured layer formed on both surfaces was prepared.

The evaluation results are listed in Table 7. Further, the coating film adhesion test was carried out for the surface of the acrylic resin laminate (cross cut method, JIS K5600-5-6). As a result, there was no peeling of the cured layer and the adhesion between the acrylic resin sheet and cured layer was good. Further, "ΔHaze" was 0.1%, showing a good value.

Example 20

The cast polymerization was performed in the same manner as Example 19 except that the polymerizable materials are changed as listed in Table 7. As a result, an acrylic resin laminate having a sheet thickness of 1 mm and a cured layer formed on both surfaces was prepared. The evaluation results are given in Table 7.

Examples 21 to 25

The cast polymerization was performed in the same manner as Example 9 except that the cast 2 described in Example 19 is used and the polymerizable materials are changed as listed in Table 8. As a result, an acrylic resin laminate having a sheet thickness of 1 mm and a cured layer formed on both surfaces was prepared. The evaluation results are given in Table 8.

Examples 26 to 31

The cast polymerization was performed in the same manner as Example 13 except that the cast 2 described in Example 19 is used and the polymerizable materials are changed as listed in Table 9. As a result, an acrylic resin laminate having a sheet thickness of 1 mm and a cured layer formed on both surfaces was prepared. The evaluation results are given in Table 9.

Example 32

An acrylic resin sheet having a sheet thickness of 1 mm was obtained in the same manner as Example 15. The acrylic resin sheet was heated to 60° C., and coated with a UV curable composition containing TAS (35 parts), C6DA (30 parts), M305 (10 parts), M400 (25 parts), and "DAROCUR TPO" (2 parts). On the coated film, a PET film having thickness of 25 µm was overlaid and compressed to eliminate air bubbles from the coated film by removing the excess UV curable composition using a rubber roll having JIS hardness of 40° to have coated film thickness of 15 µm. Thickness of the coated film was calculated based on the supply amount of the UV curable composition and developed area (530 cm$^2$). The obtained laminate was placed in an environment at 60° C. and kept therein for 60 seconds.

Subsequently, with speed of 2.5 m/min, the laminate was passed through 20 cm below the metal halide lamp having output of 9.6 kW while the coated film side is exposed on top surface. Accordingly, the coated film was irradiated with UV light through PET film for curing the coated film. After that, by peeling of the PET film, an acrylic resin laminate having a cured layer formed on one surface of the acrylic resin sheet was obtained. Lamp irradiation condition includes integrated light quantity of 570 mJ/cm$^2$ and peak luminance of 220 mW/cm$^2$. The cured layer has film thickness of 13 µm. Meanwhile, thickness of the cured layer was obtained from a differential interference contrast microscopic image of the cross-section of an obtained laminate.

Subsequently, by laminating another cured layer on the other surface of the acrylic resin sheet laminated with the cured layer in the same manner as above, an acrylic resin laminate having a cured layer formed on both surfaces and a sheet thickness of 1 mm was prepared. The evaluation results are listed in Table 9.

Example 33

An acrylic resin sheet having a sheet thickness of 1 mm was prepared in the same manner as Example 16. On the top of the acrylic resin sheet, a cured layer was laminated in the same manner as Example 32, and thus an acrylic resin laminate having a cured layer formed on both surfaces and a sheet thickness of 1 mm was prepared. The evaluation results are listed in Table 9.

Example 34

The cast 2 described in Example 19 was used and the polymerizable materials are changed as listed in Table 10. With other conditions the same as Example 9, the cast polymerization was performed. As a result, an acrylic resin laminate having a cured layer formed on both surfaces and a sheet thickness of 1 mm was prepared. The evaluation results are given in Table 10.

Examples 35 to 40

The cast 2 described in Example 19 was used. In addition, a polymerizable material containing the syrup, MMA and NPG in an amount listed in Table 11, 0.3 parts of t-hexyl peroxypivalate, and 0.05 parts of sodium dioctyl sulfosuccinate was prepared. The cast polymerization was performed in the same manner as Example 19 except that the resulting polymerizable materials are used. As a result, an acrylic resin laminate having a cured layer formed on both surfaces and a sheet thickness of 1 mm was prepared. The evaluation results are given in Table 11.

Comparative Example 3

A polymerizable material containing the syrup 1 (70 parts), 30 parts of MMA, 0.3 parts of t-hexyl peroxypivalate, and 0.05 parts of sodium dioctyl sulfosuccinate was prepared. The cast polymerization was performed in the same manner as Example 9 except that the resulting polymerizable material is used and the cast 2 described in Example 19 is used. As a result, an acrylic resin laminate having a cured layer formed on both surfaces and a sheet thickness of 1 mm was prepared. The evaluation results are given in Table 11. As no copolymer (B) was used, the acrylic resin laminate has poor impact resistance. Further, as no "other vinyl monomer" was used, it has a large water absorption displacement amount.

Comparative Example 4

The cast 2 described in Example 19 was used and the syrup 4-7 was used as the polymerizable material. With other conditions the same as Example 13, the cast polymerization was performed. As a result, an acrylic resin laminate having a cured layer formed on both surfaces and a sheet thickness of 1 mm was prepared. The evaluation results are given in Table 11. Because the use amount of "other vinyl monomer" was large, the resulting acrylic resin laminate exhibited poor impact resistance.

TABLE 1

| Abbreviated symbol | Compound |
| --- | --- |
| MMA | Methyl methacrylate |
| TBMA | t-Butyl methacrylate |
| IBXMA | Isobornyl methacrylate |
| IBXA | Isobornyl acrylate |
| BA | Butyl acrylate |
| NPG | Neopentyl glycol dimethacrylate |
| EDMA | Ethylene glycol dimethacrylate |
| EMA | Ethylene-methyl acrylic acid copolymer |
| EB440H | Ethylene-methyl acrylic acid copolymer (trade name: REXPEARL EMA, methyl acrylate unit content of 20%, manufactured by Japan Polyethylene Corporation) |
| EB050S | ethylene-methyl acrylate copolymer (trade name: REXPEARL EMA, methyl acrylate unit content of 24%, manufactured by Japan Polyethylene Corporation) |
| 28MA07 | ethylene-methyl acrylate copolymer (trade name: LOTRYL EMA, methyl acrylate unit content of 28%, manufactured by ARKEMA) |
| 29MA03 | ethylene-methyl acrylate copolymer (trade name: LOTRYL EMA, methyl acrylate unit content of 29%, manufactured by ARKEMA) |
| C6DA | 1,6-Hexanediol diacrylate |
| TAS | Condensation mixture of succinic acid/trimethylol ethane/acrylic acid at molar ratio of 1:2:4 |
| M305 | Pentaerythritol triacrylate (manufactured by Toagosei Co., Ltd., trade name: ARONIX M305) |
| M400 | Dipentaerythritol hexaacrylate (manufactured by Toagosei Co., Ltd., trade name: ARONIX M400) |
| BEE | Benzoin ethyl ether |
| DAROCUR TPO | 2,4,6-Trimethylbenzoyl-diphenyl-phosphine oxide (manufactured by BASF Japan, trade name) |

TABLE 2

| | MMA | Ethylene-alkyl acrylate copolymer (B-2) | |
| --- | --- | --- | --- |
| Syrup No. | Use amount (parts by mass) | Type | Use amount (parts by mass) |
| 1 | 100 | — | — |
| 2-1 | 100 | EB050S | 0.0057 |
| 2-2 | 100 | EB050S | 0.0143 |
| 2-3 | 100 | EB050S | 0.0357 |
| 2-4 | 100 | EB050S | 0.1429 |
| 2-5 | 100 | EB050S | 0.4286 |
| 2-6 | 100 | EB050S | 0.6036 |
| 2-7 | 100 | EB050S | 0.0071 |
| 2-8 | 100 | EB050S | 0.0714 |

TABLE 3

| | MMA | Other vinyl monomer | | Ethylene-alkyl acrylate copolymer (B-2) | |
| --- | --- | --- | --- | --- | --- |
| Syrup No. | Use amount (parts by mass) | Type | Use amount (parts by mass) | Type | Use amount (parts by mass) |
| 3 | 58 | IBXMA/IBXA/TBMA/BA | 17/3/11/1 | — | — |
| 4-1 | 68 | IBXMA/IBXA/TBMA/BA | 20/3/8/1 | EB050S | 0.1 |

TABLE 3-continued

| Syrup No. | MMA Use amount (parts by mass) | Other vinyl monomer Type | Other vinyl monomer Use amount (parts by mass) | Ethylene-alkyl acrylate copolymer (B-2) Type | Ethylene-alkyl acrylate copolymer (B-2) Use amount (parts by mass) |
|---|---|---|---|---|---|
| 4-2 | 68 | IBXMA/IBXA/TBMA/BA | 20/3/8/1 | EB050S | 0.2 |
| 4-3 | 68 | IBXMA/IBXA/TBMA/BA | 20/3/8/1 | EB440H | 0.1 |
| 4-4 | 67 | IBXMA/IBXA/TBMA/BA | 20/3/8/1 | EB050S | 0.1 |
| 4-5 | 73 | IBXMA/IBXA/TBMA/BA | 11/2/10/1 | EB050S | 0.05 |
| 4-6 | 73 | IBXMA/IBXA/TBMA/BA | 11/2/10/1 | EB050S | 0.1 |
| 4-7 | 38 | IBXMA/TBMA/BA | 40/20/2 | EB050S | 0.1 |

TABLE 4

| | Polymerizable material | | | | Content of copolymer (B-2) in acrylic resin sheet | | Physical property of acrylic resin sheet | | |
|---|---|---|---|---|---|---|---|---|---|
| | MMA Use amount (parts by mass) | 1% Dispersion of EMA* Type | 1% Dispersion of EMA* Use amount (parts by mass) | Type | Content (% by mass) | Haze % | Total light transmittance % | 50% Impact-puncture height mm | |
| Example 1 | 90 | EB440H | 10 | EB440H | 0.1 | 1.90 | 91.5 | 400 | |
| Example 2 | 90 | EB050S | 10 | EB050S | 0.1 | 0.47 | 92.5 | 800 | |
| Example 3 | 90 | 28MA07 | 10 | 28MA07 | 0.1 | 1.03 | 92.5 | 640 | |
| Example 4 | 90 | 29MA03 | 10 | 29MA03 | 0.1 | 0.85 | 92.5 | 550 | |
| Example 5 | 97.5 | EB050S | 2.5 | EB050S | 0.025 | 0.12 | 92.5 | 233 | |
| Example 6 | 95 | EB050S | 5.0 | EB050S | 0.05 | 0.22 | 92.5 | 450 | |
| Example 7 | 80 | EB050S | 20 | EB050S | 0.2 | 0.95 | 92.4 | >1000 | |
| Example 8 | 50 | EB050S | 50 | EB050S | 0.5 | 1.90 | 92.0 | >1000 | |
| Comparative Example 1 | 100 | — | — | — | 0 | 0.05 | 92.6 | 85 | |
| Comparative Example 2 | — | EB050S | 100 | EB050S | 1.0 | 6.00 | 90.8 | >1000 | |

*MMA/EMA = 99/1

TABLE 5

| | Polymerizable material | | | | | Content of copolymer (B-2) in acrylic resin sheet | | Physical property of acrylic resin sheet | | |
|---|---|---|---|---|---|---|---|---|---|---|
| | Syrup 1 Use amount (parts by mass) | MMA Use amount (parts by mass) | EDMA Use amount (parts by mass) | 1% Dispersion of EMA* Type | 1% Dispersion of EMA* Use amount (parts by mass) | Type | Content (% by mass) | Haze % | Total light transmittance % | 50% Impact-puncture height mm |
| Example 9 | 70 | 29.5 | 0.03 | EB050S | 0.5 | EB050S | 0.005 | 0.10 | 92.5 | 160 |
| Example 10 | 70 | 29.5 | 0.03 | EB050S | 1 | EB050S | 0.01 | 0.15 | 92.5 | 180 |
| Example 11 | 70 | 27.5 | 0.03 | EB050S | 2.5 | EB050S | 0.025 | 0.20 | 92.6 | 250 |
| Example 12 | 70 | 20 | 0.03 | EB050S | 10 | EB050S | 0.1 | 0.75 | 92.5 | 280 |

*MMA/EMA = 99/1

TABLE 6

| | Polymerizable material | | | Content of copolymer (B-2) in acrylic resin sheet | | Physical property of acrylic resin sheet | | |
| | Syrup | MMA | EDMA | | | | | 50% Impact- |
| | Use amount (parts by mass) | Use amount (parts by mass) | Use amount (parts by mass) | | | | Total light | puncture |
| | | | | | Content | Haze | transmittance | height |
| | No. | | | Type | (% by mass) | % | % | mm |
|---|---|---|---|---|---|---|---|---|
| Example 13 | 2-1 | 70 | 30 | 0.03 | EB050S | 0.004 | 0.06 | 92.5 | 158 |
| Example 14 | 2-2 | 70 | 30 | 0.03 | EB050S | 0.01 | 0.10 | 92.5 | 258 |
| Example 15 | 2-3 | 70 | 30 | 0.03 | EB050S | 0.025 | 0.18 | 92.6 | 385 |
| Example 16 | 2-4 | 70 | 30 | 0.03 | EB050S | 0.1 | 0.45 | 92.5 | 524 |
| Example 17 | 2-5 | 70 | 30 | 0.03 | EB050S | 0.3 | 1.57 | 92.5 | 763 |
| Example 18 | 2-6 | 70 | 30 | 0.03 | EB050S | 0.4225 | 3.33 | 92.6 | 916 |

TABLE 7

| | Polymerizable material | | | | Content of copolymer (B-2) in acrylic resin sheet | | Physical properties of acrylic resin laminate | | | |
| | MMA | EDMA | 1% Dispersion of EMA* | | | | | | 50% Impact- puncture height mm | Anti-scratch property (ΔHaze) % |
| | Use amount (parts by mass) | Use amount (parts by mass) | Use amount (parts by mass) | Type | Type | Content (% by mass) | Haze % | Total light transmittance % | | |
|---|---|---|---|---|---|---|---|---|---|---|
| Example 19 | 90 | — | 10 | EB050S | EB050S | 0.1 | 0.37 | 92.1 | 350 | 0.1 |
| Example 20 | 97.5 | 0.03 | 2.5 | EB050S | EB050S | 0.025 | 0.09 | 92.0 | 416 | 0.1 |

*MMA/EMA = 99/1

TABLE 8

| | Polymerizable material | | | | | Content of copolymer (B-2) in acrylic resin sheet | | Physical properties of acrylic resin laminate | | | |
| | Syrup 1 | MMA | EDMA | 1% Dispersion of EMA* | | | | | | 50% Impact- puncture height mm | Anti-scratch property (ΔHaze) % |
| | Use amount (parts by mass) | Use amount (parts by mass) | Use amount (parts by mass) | Use amount (parts by mass) | Type | Type | Content (% by mass) | Haze % | Total light transmittance % | | |
|---|---|---|---|---|---|---|---|---|---|---|---|
| Example 21 | 70 | 29.5 | 0.03 | 0.5 | EB050S | EB050S | 0.005 | 0.11 | 92.0 | 383 | 0.1 |
| Example 22 | 70 | 29 | 0.03 | 1 | EB050S | EB050S | 0.01 | 0.13 | 92.0 | 383 | 0.1 |
| Example 23 | 70 | 27.5 | 0.03 | 2.5 | EB050S | EB050S | 0.025 | 0.20 | 92.0 | 451 | 0.1 |
| Example 24 | 70 | 25 | 0.03 | 5 | EB050S | EB050S | 0.05 | 0.41 | 92.0 | 474 | 0.1 |
| Example 25 | 70 | 20 | 0.03 | 10 | EB050S | EB050S | 0.1 | 0.66 | 92.1 | 395 | 0.1 |

*MMA/EMA = 99/1

TABLE 9

| | Polymerizable material | | | Content of copolymer (B-2) in acrylic resin sheet | | Physical properties of acrylic resin laminate | | | |
|---|---|---|---|---|---|---|---|---|---|
| | Syrup | MMA | EDMA | | | | | 50% Impact-puncture height mm | Anti-scratch property (ΔHaze) % |
| | No. | Use amount (parts by mass) | Use amount (parts by mass) | Use amount (parts by mass) | Type | Content (% by mass) | Haze % | Total light transmittance % | | |
| Example 26 | 2-7 | 70 | 30 | 0.03 | EB050S | 0.005 | 0.06 | 92.1 | 378 | 0.1 |
| Example 27 | 2-2 | 70 | 30 | 0.03 | EB050S | 0.01 | 0.07 | 92.0 | 527 | 0.1 |
| Example 28 | 2-3 | 70 | 30 | 0.03 | EB050S | 0.025 | 0.16 | 92.0 | 568 | 0.1 |
| Example 29 | 2-8 | 70 | 30 | 0.03 | EB050S | 0.05 | 0.27 | 92.1 | 454 | 0.1 |
| Example 30 | 2-4 | 70 | 30 | 0.03 | EB050S | 0.1 | 0.51 | 92.1 | 417 | 0.1 |
| Example 31 | 2-5 | 70 | 30 | 0.03 | EB050S | 0.3 | 1.45 | 92.1 | 350 | 0.1 |
| Example 32 | 2-3 | 70 | 30 | 0.03 | EB050S | 0.025 | 0.18 | 92.0 | 250 | 0.1 |
| Example 33 | 2-4 | 70 | 30 | 0.03 | EB050S | 0.1 | 0.45 | 92.0 | 300 | 0.1 |

TABLE 10

| | Polymerizable material | | | | Content of copolymer (B-2) in acrylic resin sheet | | Physical properties of acrylic resin laminate | | | | |
|---|---|---|---|---|---|---|---|---|---|---|---|
| | Syrup 3 Use amount (parts by mass) | 1% Dispersion of EMA* | | | | | | | 50% Impact-puncture height mm | Anti-scratch property (ΔHaze) % | Water absorption displacement amount mm |
| | | Type | Use amount (parts by mass) | Type | Content (% by mass) | Haze % | Total light transmittance % | | | | |
| Example 34 | 100 | EB050S | 10 | EB050S | 0.1 | 0.40 | 92.0 | 400 | 0.1 | 43 |

*MMA/EMA = 99/1

TABLE 11

| | Polymerizable material | | | Content of copolymer (B-2) in acrylic resin sheet | | Physical properties of acrylic resin laminate | | | | |
|---|---|---|---|---|---|---|---|---|---|---|
| | Syrup | MMA | NPG | | | | | 50% Impact-puncture height mm | Anti-scratch property (ΔHaze) % | Water absorption displacement amount mm |
| | No. | Use amount (parts by mass) | Use amount (parts by mass) | Use amount (parts by mass) | Type | Content (% by mass) | Haze % | Total light transmittance % | | | |
| Example 35 | 4-1 | 100 | — | — | EB050S | 0.1 | 0.60 | 92.0 | 420 | 0.1 | 42 |
| Example 36 | 4-2 | 100 | — | — | EB050S | 0.2 | 1.10 | 92.0 | 510 | 0.1 | 43 |
| Example 37 | 4-3 | 100 | — | — | EB440H | 0.1 | 0.70 | 92.0 | 300 | 0.1 | 41 |
| Example 38 | 4-4 | 99 | — | 1 | EB050S | 0.1 | 0.60 | 92.0 | 410 | 0.1 | 38 |
| Example 39 | 4-5 | 97 | — | 3 | EB050S | 0.05 | 0.20 | 92.0 | 360 | 0.1 | 36 |
| Example 40 | 4-6 | 97 | — | 3 | EB050S | 0.1 | 0.30 | 92.0 | 450 | 0.1 | 35 |
| Comparative Example 3 | 1 | 70 | 30 | — | — | — | 0.06 | 92.0 | 190 | 0.1 | 55 |
| Comparative Example 4 | 4-7 | 100 | — | — | EB050S | 0.1 | 0.80 | 91.0 | 55 | 0.1 | 35 |

EXPLANATION OF SYMBOLS

1 Test specimen sheet
2 Non-fixed end part of test specimen sheet
3 Jig for fixing test specimen sheet
L1 Length of part for fixing test specimen sheet (50 mm)

INDUSTRIAL APPLICABILITY

The acrylic resin sheet and the acrylic resin laminate of the invention are suitable for optical applications like a display front panel.

The invention claimed is:

1. An acrylic resin composition comprising 100 parts by mass of an acrylic polymer (A-1) having 50 to 100% by mass of a methyl methacrylate unit, 0 to 50% by mass of a different vinyl monomer unit and 0.002 to 0.7 parts by mass of an ethylene-alkyl acrylate copolymer (B-2).

2. The acrylic resin composition according to claim 1, wherein the different vinyl monomer unit is at least one selected from the group consisting of a (meth)acrylic acid ester unit having an alicyclic hydrocarbon group with 6 to 20 carbon atoms, a (meth)acrylic acid ester unit having a linear or branched hydrocarbon group with 3 to 10 carbon atoms, and a monomer unit having two or more ethylenically unsaturated bonds in the monomer.

3. The acrylic resin composition according to claim 1, wherein the ethylene-alkyl acrylate copolymer (B-2) is present in an amount of 0.02 to 0.5 parts by mass based on 100 parts by mass of the acrylic polymer (A-1).

4. The acrylic resin composition according to claim 3, wherein the alkyl acrylate unit in the ethylene-alkyl acrylate copolymer (B-2) is present in an amount of 15 to 40% by mass.

5. An acrylic resin sheet comprising the acrylic resin composition according to any one of claims 1 and 2 to 4, wherein the ethylene-alkyl acrylate copolymer (B-2) is dispersed in the acrylic polymer (A-1).

6. An acrylic resin sheet comprising the acrylic resin composition according to any one of claims 1 and 2 to 4, which has a haze value of 0.5% or less based on JIS K 7136, a 50% impact-puncture height of 350 mm or more in a falling ball test based on JIS K 7211 under the conditions described below, and a sheet thickness of 2 mm or less:
wherein a method for the falling ball test is described as follows:
test specimen is square with a single side length of 50 mm,
supporting board is a 5 mm-thick acrylic plate having a round hole with a diameter of 20 mm,
falling ball is a ball made of stainless steel wherein ball diameter is 20.0 mm$\phi$, mass: 35.9 g,
temperature of measurement atmosphere is 23° C.,
relative humidity of measurement atmosphere is 50%,
time for keeping a test specimen before measurement in measurement atmosphere is 24 hours or longer, and
test order described in JIS K 7211-1 is described as follows:
the test specimen is placed on top of the supporting board such that the center of the hole in the supporting board is in match with the center of the test specimen,
right and left sides of the test specimen are fixed on the supporting board using a cellophane tape, and then a stainless steel ball is dropped onto the center of the test specimen under the conditions including a temperature of 23° C. and a relative humidity of 50%,
the falling height is changed by 25 mm, and the test number for each falling height is 20.

7. The acrylic resin sheet according to claim 6, wherein a water absorption displacement amount y measured by the method described below is 45 mm or less,
wherein a method for measuring water absorption displacement amount is described as follows:
a test specimen of the sheet with a length of 200 mm and a width of 50 mm is kept for 24 hours under an environment including a temperature of 85° C. and a relative humidity of 85% while one end of the specimen (length: 50 mm) is fixed in a horizontal state,
a warpage amount (water absorption displacement amount) y in perpendicular direction of the other end of the test specimen that has not been fixed, is subsequently measured.

8. An acrylic resin laminate having a cured layer laminated on at least one surface of an acrylic resin sheet obtained from an acrylic resin composition which comprises 100 parts by mass of an acrylic polymer (A-1) having 50 to 100% by mass of a methyl methacrylate unit and 0 to 50% by mass of a different vinyl monomer unit and 0.002 to 0.7 parts by mass of an ethylene alkyl acrylate copolymer (B-2).

* * * * *